(12) United States Patent
Seyfried et al.

(10) Patent No.: US 7,280,570 B2
(45) Date of Patent: Oct. 9, 2007

(54) DEVICE FOR GENERATING A LIGHT BEAM INCLUDING MULTIPLE WAVELENGTHS

(76) Inventors: Volker Seyfried, Jahnstrasse 28, D-69226 Nussloch (DE); Rafael Storz, Blumenstrasse 44, D-69115 Heidelberg (DE)

( * ) Notice: Subject to any disclaimer, the term of this patent is extended or adjusted under 35 U.S.C. 154(b) by 253 days.

(21) Appl. No.: 11/011,476

(22) Filed: Dec. 14, 2004

(65) Prior Publication Data

US 2005/0249457 A1    Nov. 10, 2005

Related U.S. Application Data

(60) Provisional application No. 60/532,837, filed on Dec. 23, 2003.

(30) Foreign Application Priority Data

Dec. 15, 2003  (DE)  ............................... 103 59 015
Dec. 22, 2003  (DE)  ............................... 103 61 176

(51) Int. Cl.
*H01S 3/10*   (2006.01)
*H01S 3/14*   (2006.01)

(52) U.S. Cl. .......................................... 372/23; 372/68

(58) Field of Classification Search ................. 372/23, 372/68
See application file for complete search history.

(56) References Cited

U.S. PATENT DOCUMENTS

| | | | | |
|---|---|---|---|---|
| 4,635,263 A * | 1/1987 | Mollenauer | ..................... | 372/3 |
| 6,222,961 B1 | 4/2001 | Engelhardt et al. | ........... | 385/31 |
| 6,462,345 B1 | 10/2002 | Simon et al. | | |
| 6,750,457 B2 * | 6/2004 | Heffelfinger et al. | .... | 250/458.1 |
| 6,822,978 B2 * | 11/2004 | Kafka et al. | .................. | 372/18 |
| 2003/0058530 A1 * | 3/2003 | Kawano | ..................... | 359/385 |

FOREIGN PATENT DOCUMENTS

| | | |
|---|---|---|
| DE | 196 33 185 | 10/1997 |
| DE | 19829981 | 1/2000 |
| EP | 0473071 | 3/1992 |
| EP | 1170607 | 1/2002 |
| GB | 2153546 | 8/1985 |

OTHER PUBLICATIONS

Profile Optische Systeme GmbH, "Operating Instruction", PRO 8000 / PRO 800, 1998, Karlsuhe, Germany, pp. cover page, 1, 3, 4, 8, 9, 11, 12.

* cited by examiner

*Primary Examiner*—Armando Rodriguez (57) ABSTRACT

A device for generating a light beam having several wavelengths includes a beam recombiner arrangement for recombining several laser light beams having different wavelengths. The beam recombiner arrangement includes several individual beam recombiners arranged in a row or in groups parallel to each other and each configured to couple in a respective laser light beam having a wavelength of a defined wavelength range.

41 Claims, 6 Drawing Sheets

DEVICE FOR GENERATING A LIGHT BEAM INCLUDING MULTIPLE WAVELENGTHS

Priority is claimed to provisional application 60/532,837, filed Dec. 23, 2003, to German patent application DE 103 61 176.2, filed Dec. 22, 2003, and to German patent application DE 103 59 015.3, filed Dec. 15, 2003, the subject matter of each of which is hereby incorporated by reference herein.

The present invention relates to a device for generating a light beam comprising several wavelengths, particularly an illuminating light beam for a preferably confocal scanning microscope, having a beam recombiner arrangement for recombining laser light beams having different wavelengths, whereby the arrangement comprises individual beam recombiners.

Devices for generating a light beam having several wavelengths are known in actual practice and are described, for example, in German patent DE 196 33 185 C2. This publication discloses a polychromatic point light source for a laser scanning microscope in which laser light beams having different wavelengths are coaxially recombined by means of a beam recombiner arrangement. The beam recombiner arrangement shown there comprises three beam recombiners and it is designed as a single unit. After the beam recombination, the recombined laser light beams are guided via an optical fiber to a microscope, where they are coupled in.

The prior-art devices are problematic, particularly because of their inadequate flexibility. In most cases, the sources of laser light are permanently attached to the beam recombiner arrangement so that it is almost impossible to couple in additional sources of laser light or another combination of sources of laser light. If the laser light beams are coupled into the beam recombiner arrangement via optical fibers, then the possibilities for coupling in the laser light sources are limited by the concrete arrangement and design of the beam recombiners of the beam recombiner arrangement. Moreover, as a rule, all of the laser light beams coupled into the beam recombiner arrangement have to be adjusted, as a result of which replacing the sources of laser light is not a simple procedure. Generally speaking, when individual sources of laser light are replaced, it is also necessary to replace and readjust the individual beam recombiners so as to allow the recombination of the various laser light beams. The devices known from the state of the art for generating a light beam comprising several wavelengths are thus extremely user-unfriendly, as a result of which, in most cases, a special service call by the device manufacturer could certainly become necessary.

SUMMARY OF THE INVENTION

It is an object of the present invention to provide a device of the above-mentioned type for generating a light beam comprising several wavelengths in such a way that the spectral composition of the light beam to be generated can be selected virtually at will and can be easily changed by a user without involving the replacement of parts or readjustment.

The present invention provides a device for generating a light beam comprising several wavelengths, such as an illuminating light beam for a preferably confocal scanning microscope, having a beam recombiner arrangement for recombining laser light beams with different wavelengths. The arrangement includes individual beam recombiners arranged in a row or in groups parallel to each other and each configured to couple in a laser light beam having a wavelength of a defined wavelength range.

According to the invention, it was first recognized that there is a growing tendency towards modular device units which can be employed by users in a simple manner without entailing a lot of maintenance. In this context, it was also recognized that special importance is now ascribed to a high flexibility and adaptability to special wishes and requirements of the user. Finally, it was recognized that such a flexibility is attained when the beam recombiners are arranged according to the invention in a row or in groups parallel to each other and are each configured to couple in a laser light beam having a wavelength of a defined wavelength range. For instance, with the device according to the invention, the user of a microscope is able to individually compose the necessary wavelengths of his illuminating light beam and to change the composition without having to perform any retooling or adjustment work for this purpose. In this respect, a highly user-friendly device has been attained for generating a light beam comprising several wavelengths.

BRIEF DESCRIPTION OF THE DRAWINGS

There are various ways to implement and refine the teaching of the present invention in an advantageous manner. The present invention is elaborated upon below based on exemplary embodiments with reference to the drawings. The drawings show the following.

DETAILED DESCRIPTION

In an embodiment, beam recombiners are employed which operate in a wavelength-sensitive manner. In particular, the beam recombiners could each have an individual characteristic wavelength such that laser light beams having wavelengths below the characteristic wavelength are essentially transmitted, while laser light beams having wavelengths above the characteristic wavelength are essentially reflected, whereby the reverse situation would also be conceivable. Naturally, both types of beam recombiners could be provided in the beam recombiner arrangement.

The beam recombiners could be configured as band-edge filters, as dichroitic filters or as etalons. An advantageously effective beam recombination is achieved by using band-edge filters with steep edges. One side of such filters generally has a special coating consisting of several layer packets to ensure that the filter has the desired spectral characteristics. An antireflection coating could be provided on the other side. As a matter of principle, polarization-sensitive elements or neutral dividers or dispersive elements in the form of prisms or optical diffraction grating can also be employed as beam recombiners.

In an embodiment, all of the beam recombiners are arranged behind each other so as to form an array, whereby they are sorted according to their appertaining characteristic wavelength, that is to say, from short to long or vice-versa.

In another embodiment, the beam recombiner could have a tree-like geometry. Here, several laser light beams are first recombined with each other in parallel branches and subsequently, the laser beams resulting from the parallel branches are recombined with each other along a main beam path to form the final light beam. The advantage of this tree-like structure is that the number of passages through the beam recombiner for the individual laser light beams is smaller in comparison to the arrangement in a row. In principle, the beam recombiners could also be positioned in a combination consisting of a parallel arrangement and a row arrangement.

The wavelength range defined individually for each of the beam recombiners could have a predefinable spectral width. In an advantageous manner, this width could be adapted to concrete measurement requirements. For instance, it is known in fluorescence microscopy that, for most fluorescent dyes, the spectral width of the possible excitation wavelength range lies in the order of magnitude of 40 nm FWHM (full width at half maximum). Consequently, with an eye towards ensuring that all of the fluorescent dyes present in a given specimen can be excited, it is necessary to have an excitation light beam that comprises wavelengths that are separated from each other by 40 nm at the maximum. Therefore, in order to adapt to these requirements encountered in actual practice, it could be provided that the wavelength range defined individually for each of the beam recombiners has a spectral width of less than 40 nm.

Taking into account the fact that the width of the excitation maximum of the dyes is typically about 20 nm, there is a need for an excitation light beam with wavelengths that differ from each other by 20 nm at the maximum in order to attain an optimal excitation of the fluorescent dyes in the specimen. Therefore, the wavelength range defined individually for each of the beam recombiners could advantageously have a spectral width of less than 20 nm. As a rule, wavelengths that are even closer to each other no longer make sense since a grid of excitation wavelengths separated from each other by 20 nm can be used to optimally excite practically any fluorescent dye.

With an eye towards attaining a clear overview, it is advantageous if the wavelength range defined individually for each of the beam recombiners has the same spectral width and if, in addition, the spectral center positions of the wavelength ranges defined individually for the beam recombiners are equidistant from each other. In this context, the wavelength ranges defined individually for each of the beam recombiners could partially overlap each other or else could be completely separate from each other. In particular, the wavelength ranges defined individually for each of the beam recombiners could be specified in such a way that the totality of the laser light beams that can be coupled in encompasses the complete spectrum of relevant wavelengths, for instance, the visible spectrum from 430 nm to 700 nm.

With an eye towards simplicity of use, it could be provided that the beam recombiner arrangement is enclosed in a housing so that the internal structure of the beam recombiner arrangement is not at all visible to the user.

The internal structure of the beam recombiner arrangement could be configured in such a way that collimating lenses are arranged in front of the individual beam recombiners for purposes of rendering the laser light beams parallel. The laser light beams could be deflected onto the collimating lenses via optical fibers, especially glass fibers.

In order to prevent a de-adjustment, the beam recombiners and the collimating lenses could be permanently attached to the housing, either directly or indirectly.

In an advantageously user-friendly embodiment, the sources of laser light, preferably in miniaturized form, are arranged inside the housing and associated with the beam recombiners. Moreover, it could also be provided that the sources of laser light can be activated and de-activated independently of each other from outside of the housing. Thus, a user could compose a light beam in a simple manner by simply activating the appropriate sources of laser light which then, owing to the structure according to the invention, are recombined with each other without the need for any other action on the part of the user.

In an alternative embodiment, the sources of laser light can be arranged outside of the housing, whereby the individual laser light beams could be coupled into the optical fibers by means of fiber connectors functioning as optical interfaces. The fiber connectors could either be placed inside the housing of the beam recombiner or else be provided outside of the housing. In the latter case, the laser light beams are guided to the outside via fiber openings created in the housing.

In order to avoid operating errors, the fiber connectors and/or the fiber openings on the housing have characteristic lettering and/or marking that indicates which concrete wavelength range can be coupled into the fiber connector in question.

The light is transmitted to the optical interface formed by a fiber connector either by means of direct contact between two fibers, which could optionally be at a small distance from each other, or else this can be done in collimated form in that collimating lenses are installed on both sides of the fiber ends. These could be advantageously accommodated in the fiber connector itself. By the same token, of course, it is also conceivable to have a glass fiber on only one side of the optical interface and to then guide the light on the other side via a free beam optical element.

In the case of direct contact between two glass fibers, care should be taken to ensure that the glass fibers have a large cross section in order to facilitate adjustment and to avoid light losses. Since the single-mode glass fibers normally used in the visible spectrum have optical cross sections of less than 5 µm, which renders any adjustment difficult or impossible, an option here is the use of special microstructured glass fibers. These could be made of so-called photonic bandgap material and consequently have the properties of photonic crystals. Such fibers can have considerably larger optical cross sections of more than 10 µm, even though their optical properties still match those of single-mode glass fibers.

As an alternative, fibers having a tapered structure (tapered fibers) could also be employed. With such fibers, the cross section along the fiber changes whereby, in an embodiment, these fibers could be made in such a way that the cross section at the end of the fiber is larger than at an inner portion of the fiber.

In order to couple out the light beam, the beam recombiner arrangement has an output that is configured as a fiber connector or as an outlet window or an outlet opening for a free beam optical element. In the case of a fiber output, it is advantageous to use a polarization-retaining, broadband single-mode fiber that transports the light beam, for example, to a fluorescence microscope. In the case of a confocal microscope, it is especially advantageous if the beam recombiner arrangement is permanently affixed to the confocal microscope and the light beam of the beam recombiner arrangement is focused from the output of the arrangement by means of a lens directly onto the excitation pinhole diaphragm of the confocal microscope.

For a user-specific configuration of the emerging light beam, it is advantageously possible to provide an element for a spectral-sensitive adjustment of the intensity at the output of the beam recombiner arrangement. With an eye towards attaining a compact structure, the element is integrated inside the housing of the beam recombiner arrangement and positioned in front of its output. This element for the spectral-sensitive adjustment of the intensity can be an acousto-optical tunable filter (AOTF), an acousto-optical modulator (AOM), an electro-optical modulator (EOM), a liquid-crystal tunable filter (LCTF), a grating valve device (GVD) or a MEMS-based (micro-electric-mechanical system) filter. For the beam recombiner arrangement, a suitable electric interface is needed in certain cases, and this could be realized in the form of an appropriate plug-in connector.

For special applications, laser light beams having different wavelengths can be supplied to the beam recombiner arrangement by means of multi-line laser light sources such as, for example, argon lasers, krypton lasers, argon-krypton lasers, mixed-glass lasers, multiple fiber lasers, continuum lasers and the like. Since, in contrast to conventional beam recombiners, the individual beam recombiners or the beam recombiner arrangement are restricted to narrow spectral ranges, the use of such lasers calls for a suitable beam splitter. Such a beam splitter constitutes a system that is, in a manner of speaking, inverse vis-à-vis the beam recombiner arrangement and that separates the different wavelengths of the laser light beam of the multi-line laser light source from each other. The wavelengths thus separated can be guided to the beam recombiners of a beam recombiner arrangement in the manner described above. In this context, the beam splitter can be located upstream from the beam recombiner arrangement, it can be attached to the latter or even integrated into it. Therefore, when a multi-line laser light source is used, the laser light beam is first split by means of a beam splitter and then guided to the individual beam recombiners of the beam recombiner arrangement located, for example, downstream therefrom, or else a multiple notch filter is placed into the beam recombiner arrangement as an additional beam recombiner, said filter serving to recombine the appropriate multi-line laser with the total light beam in a manner involving as little loss as possible.

Figure 1:
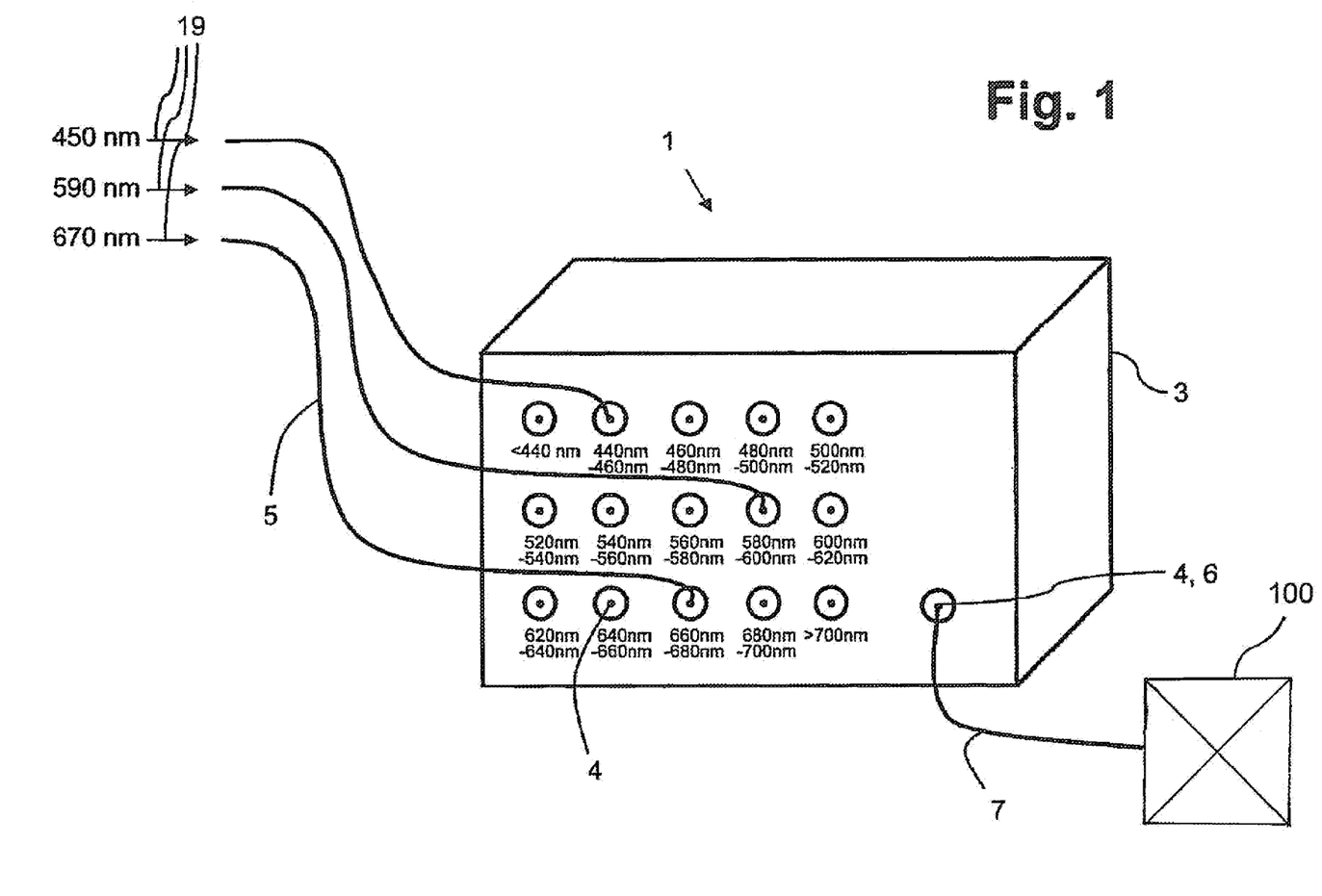
FIG. 1—a schematic depiction of a first embodiment of a device according to the invention.

FIG. 1 schematically shows a first embodiment of a device according to the invention for generating a light beam comprising several wavelengths. The beam recombiner arrangement 1 with the individual beam recombiners 2 (see FIGS. 3 and 4) is integrated into a housing 3 which constitutes a "black box", so to speak, for the user. A total of fifteen fiber connectors 4 have been integrated into the front of the housing 3 and the desired wavelengths can be coupled into said connectors via optical fibers 5. Each fiber connector 4 corresponds to a beam recombiner 2 arranged inside the housing 3 whereby, according to the invention, said connectors are each configured to couple in a laser light beam 19 having a wavelength of a defined wavelength range. Consequently, each of the total of fifteen fiber connectors 4 is marked with the wavelength range defined for that particular connector. Thus, for instance, the first fiber connector 4 on the upper left-hand side is designed for coupling in a laser light beam 19 having a wavelength smaller than 440 nm, the second fiber connector 4 of the upper row is designed for a laser light beam 19 having a wavelength between 440 nm and 460 nm, etc. All in all, the complete visible spectrum ranging from wavelengths smaller than 440 nm to greater than 700 nm is covered. The spectral width for each fiber connector—except for the edge connector—is 20 nm. The fiber connectors 4 that are not needed are not occupied and they are provided with radiation-proof covers (not shown here) for the sake of laser safety, protection and esthetics.

In the example shown here, a total of three laser light beams 19 having wavelengths of 450 nm, 590 nm and 670 nm are coupled in. Owing to the internal arrangement and design of the individual beam recombiners 2 inside the housing 3, it is ensured that all three laser light beams 19 are recombined to form one single light beam. This light beam is picked up at the output 6 of the beam recombiner arrangement 1 by means of a broadband optical fiber 7 and transmitted, for example, to a microscope 100, shown schematically in FIG. 1. The latter can be, in particular, confocal scanning microscopes, semi-confocal microscopes such as, for example, line scanners, Nipkow systems or a half-tone illumination unit. Transmission to confocal endoscopes is also of great practical significance.

Figure 2:
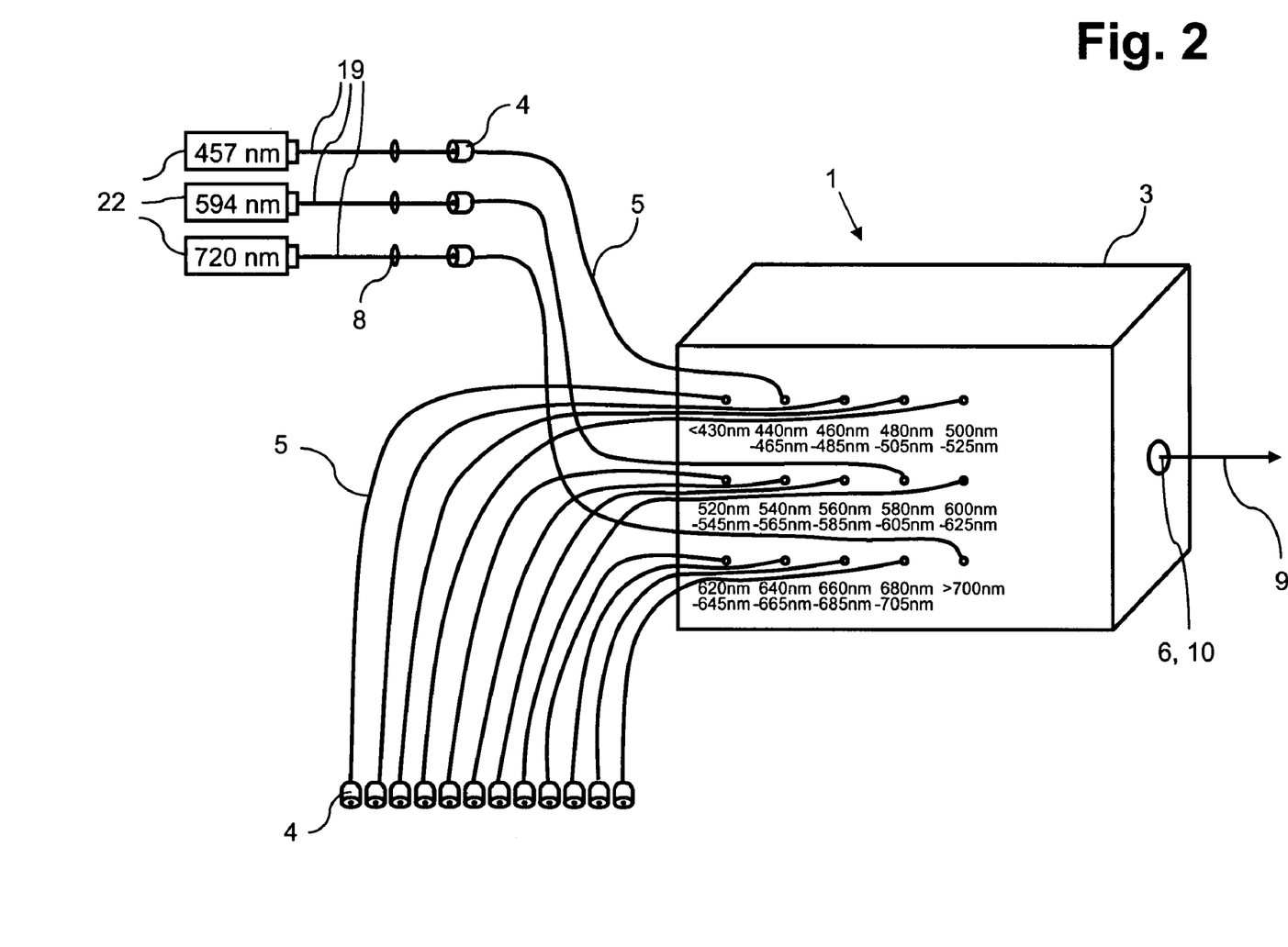
FIG. 2—a schematic depiction of a second embodiment of a device according to the invention.

FIG. 2 shows a schematic depiction of a second embodiment of a device according to the invention that only differs from the one shown in FIG. 1 in terms of the coupling in and out of the laser light beams 19. In order to couple in the laser light beams 19, fiber connectors 4 are arranged outside of the housing 3 of the beam recombiner arrangement 1. For this purpose, optical fibers 5 pass via a strain relief means from the interior of the housing 3 of the beam recombiner arrangement 1 to the outside, said optical fibers having fiber connectors 4 on their ends that serve as optical interfaces.

The laser light beams 19 of a total of three laser light sources 22 (457 nm, 594 nm, 720 nm) are each coupled into the optical fibers 5 by means of a focusing lens 8, whereby the focusing lenses 8 are only depicted separately for the sake of clarity and otherwise, in actual practice, they are permanently attached to the fiber connectors 4 so as to be permanently adjusted, or they can even be integrated into the connectors. The spectral width in the case at hand is 25 nm for each optical fiber 5 or for each beam recombiner 2 (see FIGS. 3 and 4) that corresponds to the optical fibers 5 inside the beam recombiner arrangement 1, whereby the ranges of adjacent optical fibers 5 at times overlap.

The recombined light beam 9 is coupled out of the housing 3 of the beam recombiner arrangement 1 by means of a free beam optical element through an outlet opening 10 or through an outlet window. If there is a confocal microscope located downstream, the emerging exiting light beam 9 is focused by a lens directly onto the excitation pinhole diaphragm of the confocal microscope.

Figure 3:
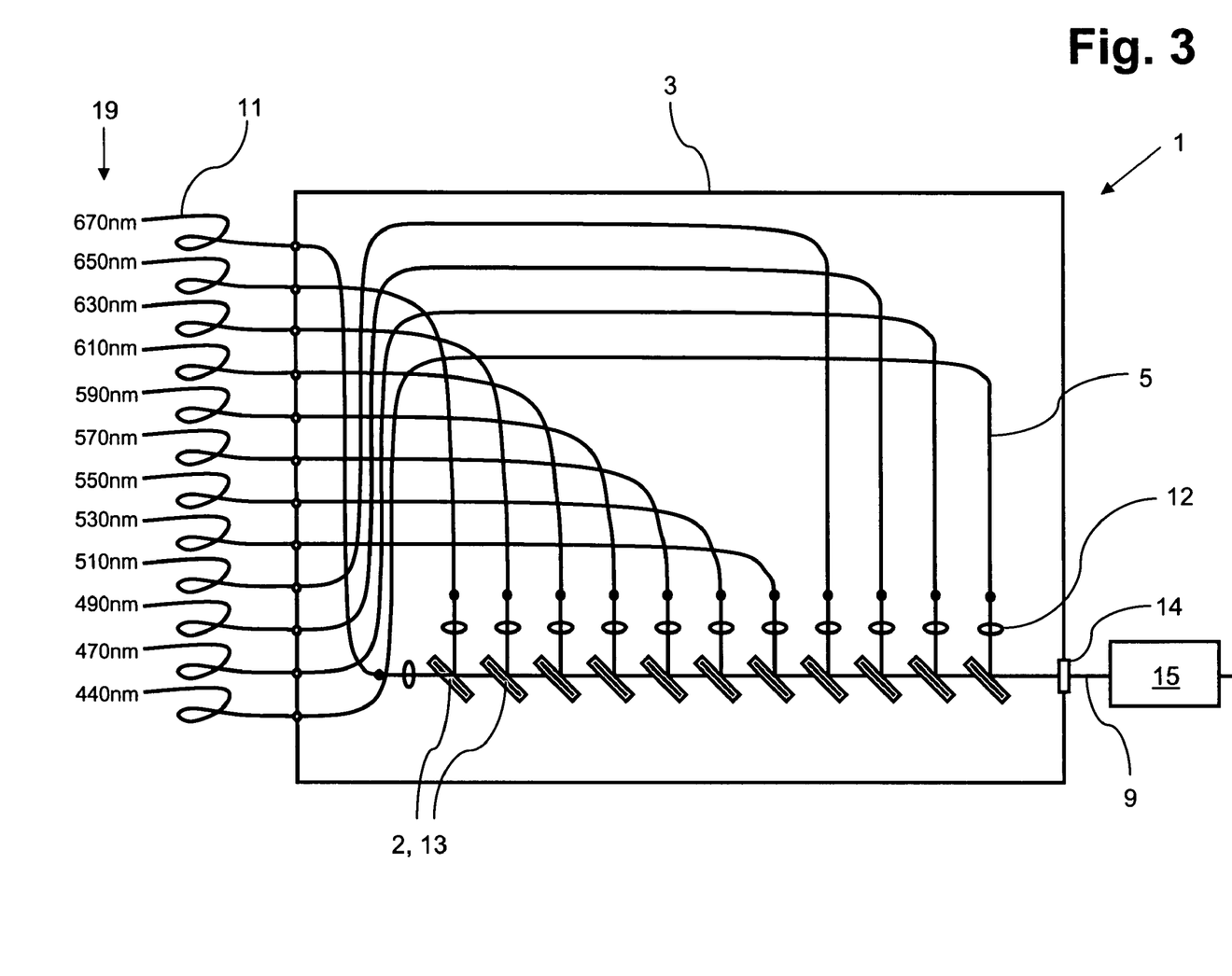
FIG. 3—a schematic depiction of a beam recombiner arrangement with beam recombiners arranged in a row.

FIG. 3 shows the internal structure of a beam recombiner arrangement 1 in which the individual beam recombiners 2 are arranged behind each other in a row inside the housing 3. Laser light beams 19 supplied from outside of the housing 3 are guided via glass fibers 11 into the interior of the housing 3 and guided to collimating lenses 12 arranged upstream from the individual beam recombiners 2. The collimating lenses 12 cause the laser light to be rendered parallel and to be guided to the appertaining beam recombiner 2.

The beam recombiners 2 are configured as band-edge filters 13 and are sorted within the row according to their appertaining band edge. In the case at hand, all of the beam recombiners 2 exhibit essentially transmissive properties for wavelengths above their band edge and essentially reflective properties for wavelengths below their band edge. In the example presented, the band-edge filter 13 having the highest band edge (approximately 660 nm) is all the way to the left in the row, while the band-edge filter 13 having the lowest band edge (approximately 455 nm) is all the way to the right in the row. In the case of the band-edge filters 13 that are in the row between these two ends, the band edge becomes successively less from left to right. Due to this arrangement, the beam recombiners 2 are each configured according to the invention to couple in a laser light beam 19 having a wavelength within a defined wavelength range. Thus, for example, in the first band-edge filter 13 all the way to the left, a laser light beam 19 having a wavelength of 670 nm is coupled in that passes through the band-edge filter 13 as well as through all of the subsequent band-edge filters 13. A laser light beam having a wavelength of 650 nm is deflected onto the other side of the band-edge filter 13. Since this wavelength lies below the specific band edge of this first band-edge filter 13, this laser light beam 19 is essentially reflected and transmitted by all of the subsequent band-edge filters 13, so that the two laser light beams 19 (with 670 nm and 650 nm) are already recombined to form one single light beam. Following the band-edge filters 13 towards the right, this procedure is repeated for all of the coupled-in laser light beams 19 so that downstream from the last band-edge filter 13, there is a light beam 9 that comprises all coupled-in wavelengths.

In housing 3 of the beam recombiner arrangement 1, there is a coupling-out window 14 that functions as a free beam output for the light beam 9 that recombines the individual laser light beams 19. For the spectral-sensitive adjustment of the intensity, the light beam 9 emerging as a free beam passes through an AOTF 15 and, after traversing this component, can then be guided, for example, to a fluorescence microscope.

Figure 4:
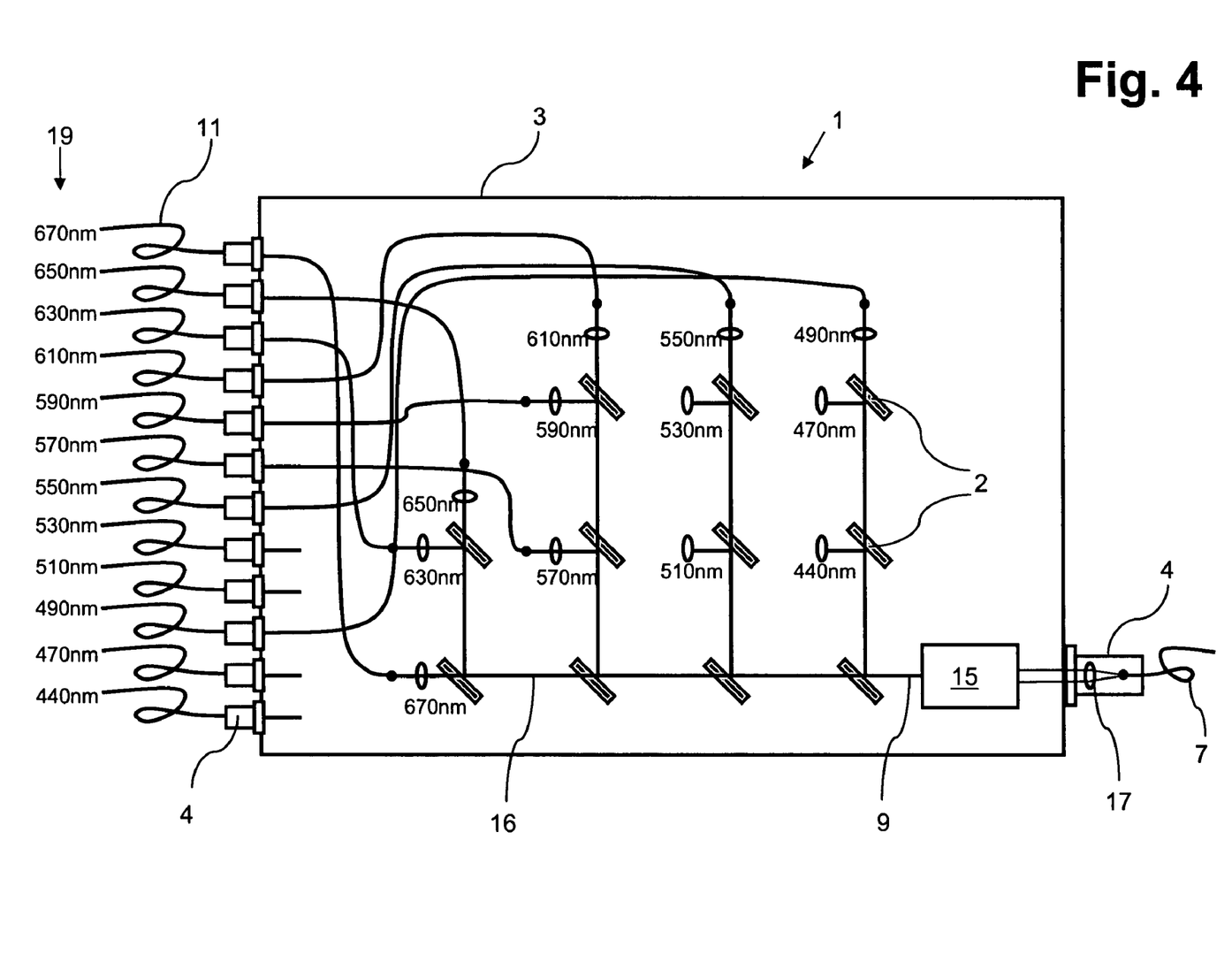
FIG. 4—a schematic depiction of a beam recombiner arrangement with beam recombiners arranged in parallel.

FIG. 4 schematically shows another embodiment of a beam recombiner arrangement 1 with a groupwise parallel arrangement of the individual beam recombiners 2. Thus, some of the laser light beams 19 are first recombined groupwise in the vertically depicted branches and the partial light beams that have been first recombined in this manner are then recombined on the horizontally depicted branch—the main beam path 16—to ultimately form the final (total) light beam 9 comprising all of the desired wavelengths.

After the recombination of all of the laser light beams, the intensity of the individual wavelengths is readjusted by means of an AOTF 15 that has been integrated into a housing 3 of the beam recombiner arrangement 1. Subsequently, the light beam 9 is coupled into a broadband optical fiber 7 via a fiber connector 4 installed on the housing 3 of the beam recombiner arrangement 1, said optical fiber 7 then transporting the light beam to an application, for instance, a microscope. The light beam 9 is coupled into the optical fiber 7 by means of a focusing optical element 17 integrated into the fiber connector 4. Both the fiber connector 4 and the focusing optical element 17 are designed so as to be adjustable.

Figure 5:
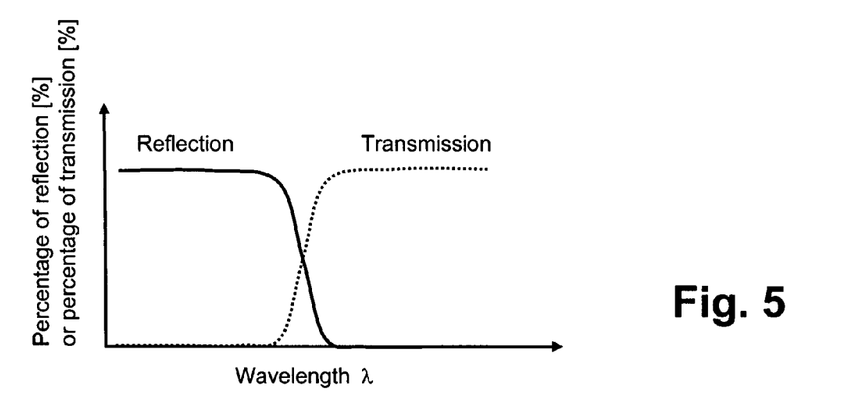
FIG. 5—in a diagram, the transmission and reflection behavior of a band-edge filter as a function of the irradiated wavelength.

FIG. 5 shows the typical transmission and reflection behavior of the employed band-edge filters 13 as a function of the wavelength. As can be clearly seen, the band-edge filters 13 have a characteristic wavelength, the so-called band edge, at which the optical characteristic of the band-edge filter 13 reverses. The band-edge filters 13 described here exhibit essentially reflective properties for wavelengths below the band edge (depicted by a solid line) while they exhibit essentially transmissive properties for light having wavelengths above the band edge (depicted by the broken line).

Figure 6:
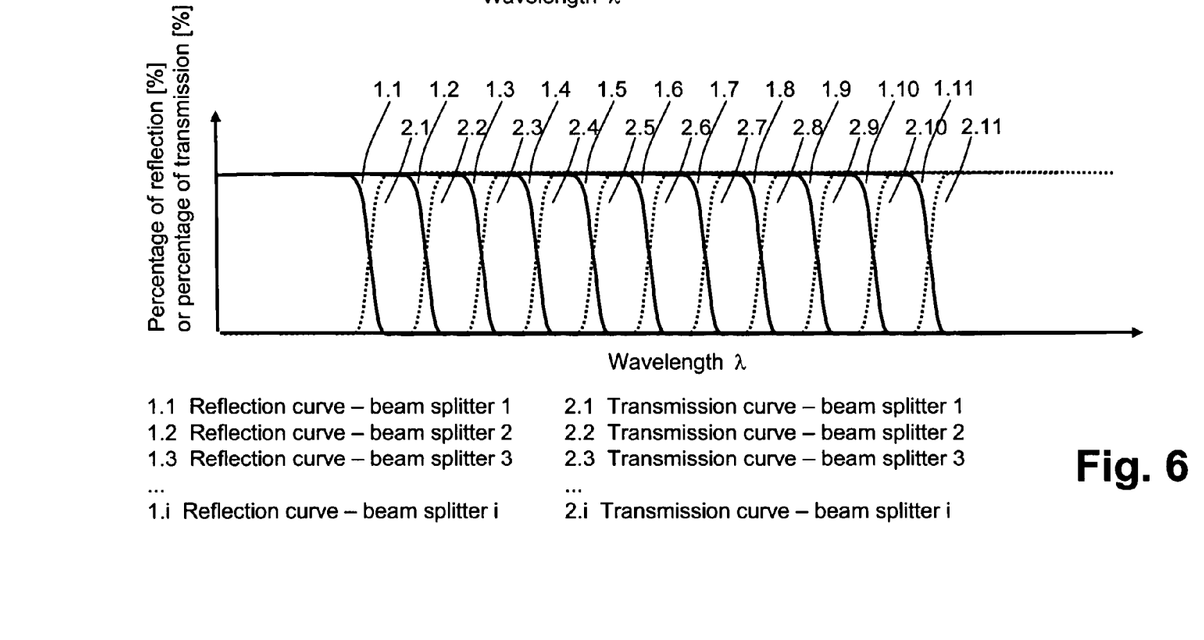
FIG. 6—in a diagram, the transmission and reflection characteristics of several band-edge filters and FIG. 7—a beam splitter for purposes of separating different wavelengths of a laser light beam of a multi-line laser light source.

For purposes of providing an overview, FIG. 6 contains a diagram that shows the transmission and reflection characteristics of the individual band-edge filters 13 as a function of the wavelength. The band edges of the individual band-edge filters 13 which are shifted with respect to each other in the wavelength can be clearly seen.

Figure 7:
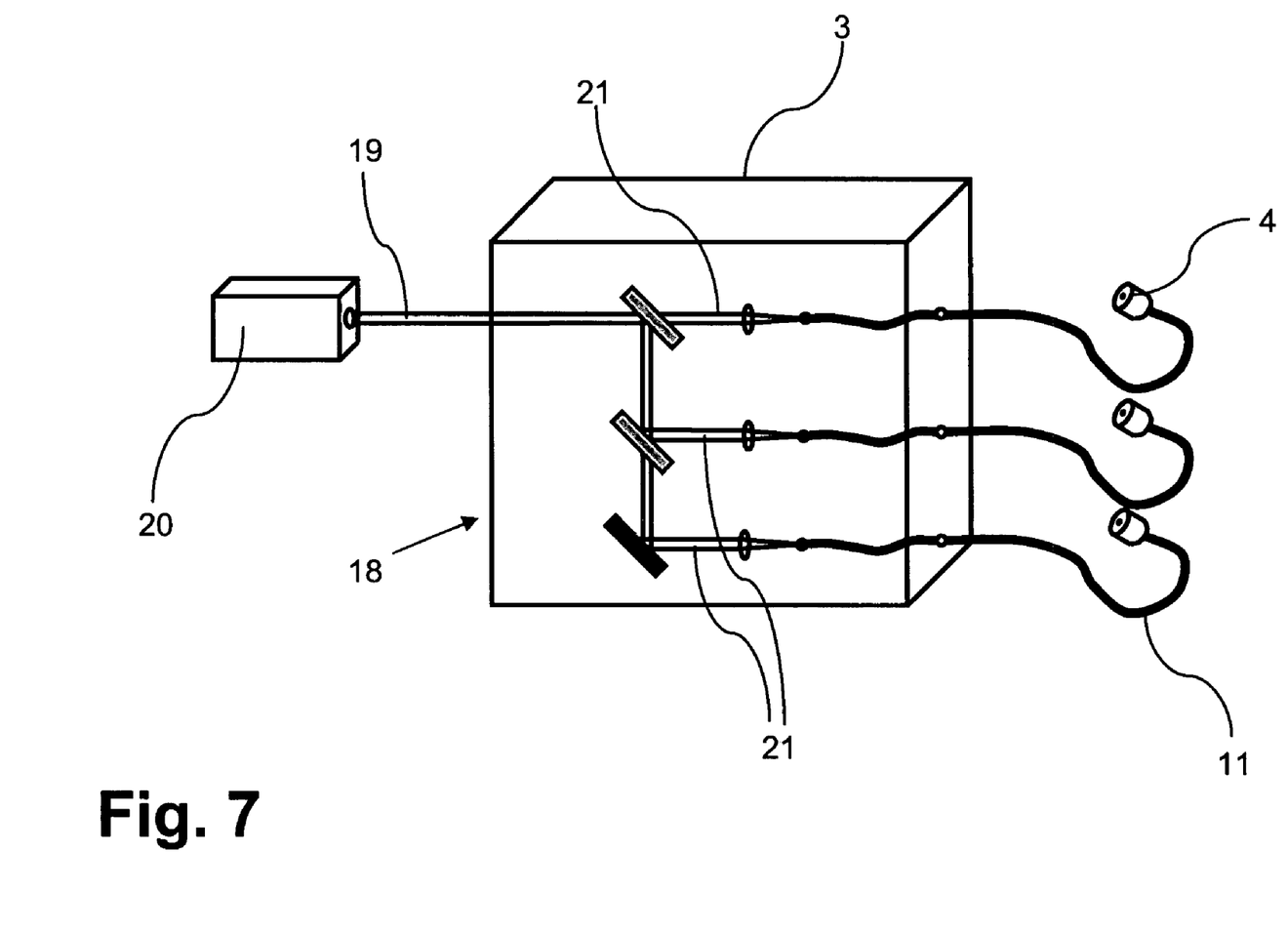

Finally, FIG. 7 schematically shows a beam splitter 18 that serves to split the laser light beam 19 of a multi-line laser light source 20 such as, for example, an argon laser or an argon-krypton laser, into the individual wavelengths contained in the laser light beam 19. The beam splitter 18 constitutes a system that is, so to speak, inverse vis-à-vis the beam recombiner arrangement 1 described above. The monochromatic laser light beams 21 thus generated are guided out of the housing 3 of the beam splitter 18 by means of glass fibers 11. Fiber connectors 4 formed on the ends of the glass fibers 11 make it possible to couple the laser light beams 21 together with other laser light beams into a beam recombiner arrangement 1 (not shown here) as described above, where they are recombined with each other as described above.

In conclusion, special mention should be made of the fact that the embodiments elucidated above serve merely for purposes of describing the teaching being claimed but that the latter is not at all restricted to these embodiments.

What is claimed is:

1. A device for generating a light beam including a plurality of wavelengths, the device comprising a beam recombiner arrangement configured to recombine a plurality of laser light beams having different wavelengths, the beam recombiner arrangement comprising a plurality of individual beam recombiners arranged in a row or in groups parallel to each other and each configured to couple in a respective laser light beam of the plurality of laser light beams, each respective laser light beam having a respective wavelength of a respective defined wavelength range, wherein each of the respective defined wavelength ranges has a respective predefinable spectral width of less than 40 nm.

2. The device as recited in claim 1 wherein the light beam is an illuminating light beam for a microscope.

3. The device as recited in claim 2 wherein the microscope is a confocal scanning microscope.

4. The device as recited in claim 1 wherein the beam recombiners are configured to operate in a wavelength-sensitive manner.

5. The device as recited in claim 1 wherein the beam recombiners each have a respective characteristic wavelength and are configured so that incoming laser light beams having wavelengths that are shorter than the characteristic wavelength are substantially transmitted, and the incoming laser light beams having wavelengths that are longer than the characteristic wavelength are substantially reflected, or vice-versa.

6. The device as recited in claim 1 wherein the beam recombiners are configured as at least one of band-edge filters, dichroitic filters and etalons.

7. The device as recited in claim 1 wherein the beam recombiners are at least one of polarization-sensitive elements and neutral dividers.

8. The device as recited in claim 1 wherein the beam recombiners are configured as dispersive elements in the form of prisms or optical diffraction gratings.

9. The device as recited in claim 1 wherein the beam recombiners are arranged in a row according to their appertaining characteristic wavelength.

10. The device as recited in claim 1 wherein the beam recombiners are arranged in a tree-like structure.

11. The device as recited in claim 1 wherein each of the respective defined wavelength ranges has a respective spectral width of less than 20 nm.

12. The device as recited in claim 1 wherein each of the respective defined wavelength ranges has a same spectral width.

13. The device as recited in claim 1 wherein respective spectral center positions of the respective defined wavelength ranges are equidistant from each other.

14. The device as recited in claim 1 wherein the laser light beams encompass a complete spectrum of relevant wavelengths.

15. The device as recited in claim 1 further comprising a housing configured to receive the beam recombiner arrangement.

16. The device as recited in claim 1 further comprising a respective collimating lens arranged in front of each of the respective beam recombiners and configured to render the respective laser light beam parallel.

17. The device as recited in claim 16 further comprising a respective optical fiber configured to deflect each of the respective laser light beam into the respective collimating lens.

18. The device as recited in claim 16 wherein the respective beam recombiner and the respective collimating lens is attached to the housing directly or indirectly.

19. The device as recited in claim 15 further comprising a plurality of sources of the laser light beams associated with the beam recombiners and disposed inside the housing.

20. The device as recited in claim 19 wherein the sources of laser light are configured to be activated and de-activated independently of each other from outside of the housing.

21. The device as recited in claim 17 further comprising a respective fiber connector forming a respective optical interface and configured to couple each of the respective laser light beams into the respective optical fiber.

22. The device as recited in claim 21 wherein each of the respective fiber connector is disposed inside a housing of the beam recombiner arrangement.

23. The device as recited in claim 21 further comprising a housing configured to receive the beam recombiner arrangement, the housing including a plurality of fiber openings, and wherein each of the respective fiber connectors is disposed inside the housing.

24. The device as recited in claim 23 further comprising a respective characteristic lettering or marking associated with at least one of each of the respective fiber connectors and each of the respective fiber openings so as to indicate the respective defined wavelength range of the respective beam recombiner.

25. The device as recited in claim 21 further comprising a respective second optical fiber associated with each of the respective laser light beams, and wherein light of each of the respective laser light beams is configured to be transmitted to the respective optical interface via a direct contact between the respective optical fiber and the respective second optical fiber.

26. The device as recited in claim 25 further comprising a respective collimating lens disposed at each end of each of the respective fibers, and wherein light of each of the respective laser light beams is configured to be transmitted to the respective optical interface via the respective collimating lenses.

27. The device as recited in claim 26 wherein the respective collimating lenses are disposed in the respective fiber connector.

28. The device as recited in claim 1 further comprising a respective free beam optical element configured to couple each of the respective laser light beams into the respective beam recombiner.

29. The device as recited in claim 17 wherein each of the respective optical fibers is a respective a microstructured glass fiber including a photonic bandgap material.

30. The device as recited in claim 29 wherein a respective optical cross section of each of the respective glass fibers at an end of the fiber is larger than 10 .mu.m.

31. The device as recited in claim 29 wherein the respective optical cross section of each of the respective glass fibers at the end of the fiber is larger than at an inner portion of the fiber.

32. The device as recited in claim 1 further comprising an output of the beam recombiner arrangement configured to couple out the light beam, the output including at least one of an optical fiber with a fiber connector and an outlet opening for a free beam optical element.

33. The device as recited in claim 32 wherein the optical fiber is a polarization-retaining, broadband single-mode fiber.

34. The device as recited in claim 32 further comprising a spectral-sensitive adjustment element for adjusting an intensity and arranged at the output of the beam recombiner arrangement.

35. The device as recited in claim 34 wherein the adjustment element is disposed inside a housing of the beam recombiner arrangement.

36. The device as recited in claim 34 wherein the adjustment element is at least one of an acousto-optical tunable filter, an acousto-optical modulator, an electro-optical modulator, a liquid-crystal tunable filter, a grating valve device and a micro-electric-mechanical system-based filter.

37. The device as recited in claim 1 further comprising a multi-line laser light source configured to provide at least a subset of the laser light beams.

38. The device as recited in claim 37 further comprising a beam splitter configured inverse with respect to the beam recombiner arrangement so as to separate the different wavelengths of the laser light beams.

39. The device as recited in claim 38 wherein the beam splitter is at least one of arranged upstream of the beam recombiner arrangement, attached to the beam recombiner arrangement and integrated into the beam recombiner arrangement.

40. The device as recited in claim 39 further comprising a multiple notch filter configured to recombine at least the subset of the laser light beams.

41. A device for generating a light beam including a plurality of wavelengths, the device comprising:
a beam recombiner arrangement configured to recombine a plurality of laser light beams having different wavelengths, the beam recombiner arrangement comprising a plurality of individual beam recombiners arranged in a row or in groups parallel to each other and each configured to couple in a respective laser light beam of the plurality of laser light beams, each respective laser light beam having a respective wavelength of a respective defined wavelength range;
an output of the beam recombiner arrangement configured to couple out the light beam, the output including at least one of an optical fiber with a fiber connector and an outlet opening for a free beam optical element; and
a spectral-sensitive adjustment element for adjusting an intensity and arranged at the output of the beam recombiner arrangement, the adjustment element being at least one of an acousto-optical tunable filter, an acousto-optical modulator, an electro-optical modulator, a liquid-crystal tunable filter, a grating valve device and a micro-electric-mechanical system-based filter.

* * * * *

UNITED STATES PATENT AND TRADEMARK OFFICE
CERTIFICATE OF CORRECTION

PATENT NO. : 7,280,570 B2 Page 1 of 1
APPLICATION NO. : 11/011476
DATED : October 9, 2007
INVENTOR(S) : Volker Seyfried et al.

It is certified that error appears in the above-identified patent and that said Letters Patent is hereby corrected as shown below:

Title Pg, Please insert,
-- (73) Assignee: Leica Microsystems CMS GmbH --.

Title Pg, Please insert, in Item (74),
--Darby & Darby--.

Signed and Sealed this

Eighteenth Day of December, 2007

JON W. DUDAS
*Director of the United States Patent and Trademark Office*